United States Patent [19]

Marola

[11] 3,972,573
[45] Aug. 3, 1976

[54] CAGE FOR AN OVERRUNNING CLUTCH

[75] Inventor: Americo E. Marola, Torrington, Conn.

[73] Assignee: The Torrington Company, Torrington, Conn.

[22] Filed: Aug. 18, 1975

[21] Appl. No.: 605,633

[52] U.S. Cl. .................................. 308/217; 192/45
[51] Int. Cl.² .................. F16C 33/46; F16D 41/07
[58] Field of Search ............... 308/201, 217, 218; 192/45

[56] References Cited
UNITED STATES PATENTS

| | | | |
|---|---|---|---|
| 3,404,760 | 10/1968 | Benson et al. ..................... | 308/217 |
| 3,500,977 | 3/1970 | Gehrke ............................... | 192/45 |
| 3,630,330 | 12/1971 | Pflugner ............................. | 192/45 |
| 3,917,036 | 11/1975 | Johnson ............................. | 192/45 |

*Primary Examiner*—M. H. Wood, Jr.
*Assistant Examiner*—Gene A. Church
*Attorney, Agent, or Firm*—Frank S. Troidl

[57] ABSTRACT

Each crossbar of the cage is provided with a longitudinal groove and a longitudinal slit extending circumferentially from the groove. A roller biasing spring is mounted in the groove with a portion of the spring extending through the slit to contact a roller.

5 Claims, 9 Drawing Figures

CAGE FOR AN OVERRUNNING CLUTCH

This invention relates to overrunning clutches. More particularly this invention is a new cage, including a new and novel roller biasing means forming part of the cage.

The purpose of this invention is to provide the art with a simple clutch cage which may be formed out of plastic or die cast metal using a simple axial-draw mold to form a cage.

Briefly described, the new cage includes at least one side rim with a plurality of circumferentially spaced crossbars extending from the rim. The rim and the crossbars define circumferentially spaced roller-receiving pockets. Each crossbar is provided with a longitudinal groove and a longitudinal slit extending circumferentially from the groove. A spring member is mounted in the groove in the crossbar with a portion of the spring member extending into the adjacent pocket and biases the roller located in said pocket.

The invention, as well as its many advantages, may be further understood by reference to the following detailed description and drawings in which.

Like parts in the various figures will be referred to by like numbers.

Figure 1:
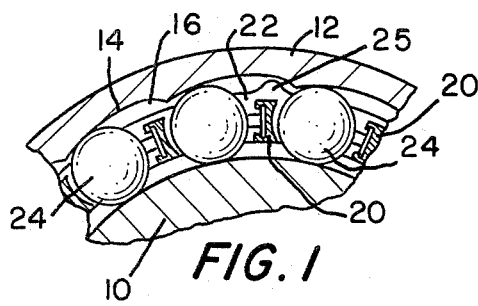
FIG. 1 is a fragmentary view, partly in section, showing an overrunning clutch.

Referring to FIG. 1, a cross-sectional view of an overrunning clutch is shown, including a shaft or inner member 10 and a housing or casing 12 provided with cam surfaces including ramps 14 and stops 16. A cage including a rim 18 (see FIG. 2) and a plurality of circumferentially spaced crossbars 20 extending from the rim 18 is in the annular space separating the shaft 10 from the casing 12. The rim 18 and the crossbars 20 define circumferentially spaced roller-receiving pockets 22, in each of which is located a roller 24. In some clutches, some rollers may be omitted. Also with some cages the pockets may hold more than one roller side by side.

When the rollers 24 are in the position shown in FIG. 1, the diameter of the rollers is more than the space between the outer periphery of the shaft 10 and the ramp 14. Hence, the rollers are in the lockup position and the shaft 10 cannot be rotated in the counterclockwise direction with respect to the casing 12. However, if the shaft 10 is rotated in the clockwise direction, the rollers will be moved clockwise to a position along the cam surface adjacent stops 16 where the space between the outer periphery of the shaft 10 and the housing 12 is greater than the diameter of the rollers 24. In this position, the shaft 10 can be freely rotated clockwise with respect to the housing 12. The cage is prevented from rotating clockwise by radial projections 25, which contact stops 16.

Figure 2:
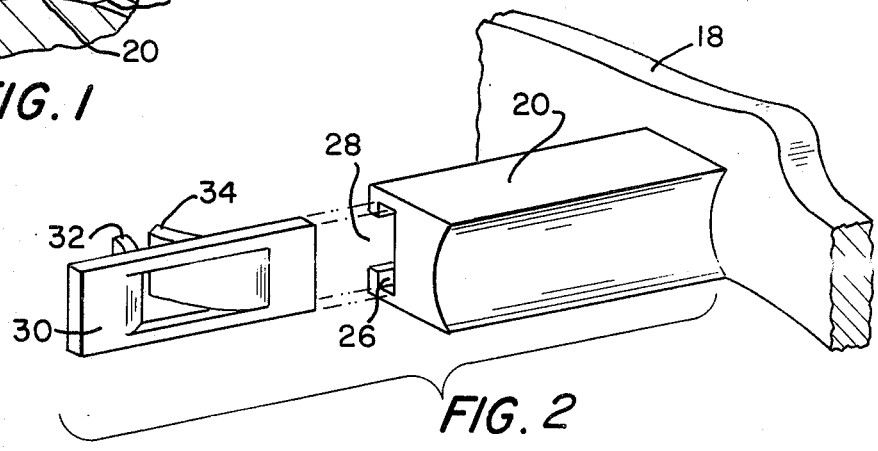
FIG. 2 is an exploded, perspective view, on an enlarged scale, showing one preferred embodiment of our invention.
Figure 3:
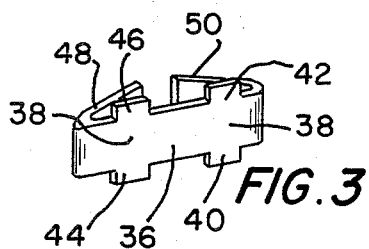
FIG. 3 is a perspective view of a second preferred embodiment of a spring member.

Our new cage for an overrunning clutch includes springs in each of the crossbars 20 which exert a bias against the roller 24 biasing the roller 24 toward the lockup position. As shown in FIG. 2, each crossbar 20 is provided with a longtudinal groove 26. A longitudinal slit 28 extends circumferentially from the groove 26. All the slits 28 extend in the same circumferential direction, and in FIG. 1 all extend in a counterclockwise direction. Spring members including a flat base plate 30 and a pair of flat spring members 32 and 34 are used to bias the roller 24. The spring member is assembled into the crossbars 20 by inserting the flat plate 30 into the groove 26 of the crossbar 20. Since the height of the flat springs 32 and 34 is less than the height of the base 30, the flat springs 32 and 34 will extend through the slit 28 and exert a bias against a roller 24 located in a pocket 22.

The different embodiments shown in each of FIGS. 3 through 6 are also constructed to be inserted in the groove 26 of the crossbar 20 with the spring portions extending through the slit 28. The spring member shown in FIG. 3 includes a flat plate portion 36 having areas of greater width 38 formed by the protuberances 40, 42, 44, and 46. A pair of flat springs 48 and 50 extend at an angle from the longitudinal ends of the flat plate 36. When assembled in the crossbar 20, the protruding portions 40, 42, 44 and 46 fit in the groove 26 and the flat springs 48 and 50 extend through the slit 28 into contact with a roller 24.

Figure 4:
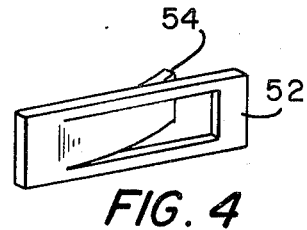
FIG. 4 is a perspective view of still another spring member embodiment.

The spring member of FIG. 4 includes a flat plate 52 with a flat spring 54 extending angularly from adjacent one end of the plate 52. This spring member may be inserted in the cage by sliding the flat plate 52 into the groove 26 with the spring 54 extending through the slit 28 in contact with the roller 24.

Figure 5:
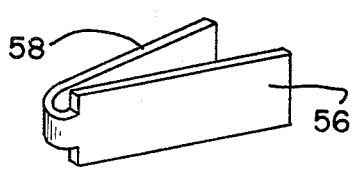
FIG. 5 is a perspective view of still another spring member embodiment.

The spring member shown in FIG. 5 is generally U-shaped with one side 56 having a greater width than the other side 58. The U-shaped spring member may be inserted into the slot of the crossbar by inserting the portion 56 into groove 26 with the side 58 extending outwardly through slit 28.

Figure 6:
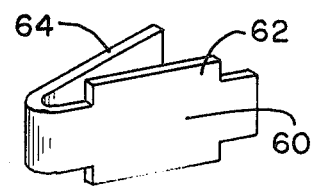
FIG. 6 is a perspective view of still another spring member embodiment.

The spring member shown in FIG. 6 is also U-shaped and includes a first side 60 having a portion 62 of greater width than the remaining portion, and a second side 64. The U-shaped member of FIG. 6 is assembled by fitting the side 60 in the groove 26 of bar 20 with the portions 62 keeping the spring member in place. The side 64 of the U-shaped spring member extends through the slit 28 into contact with the roller.

Figure 7:
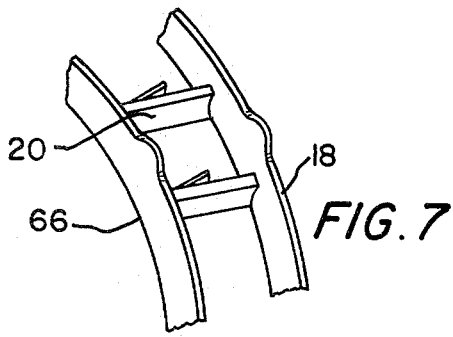
FIG. 7 is a perspective view illustrating the invention with a cage having two end rims.

The embodiment of FIG. 7 shows a two-rimmed cage including rim 18 and a second rim 66. Any of the spring member embodiments shown in the various figures may be used with a two rimmed cage as well as a one rimmed cage. The cage of FIG. 7 is assembled by first inserting the spring members into the longitudinal slots in the bars 20 and then connecting the second rim 66 to the ends of the crossbars 20. Rim 66 may be bonded or welded or mechanically attached to the free ends of the crossbars 20 to form a cage with two end rims.

Figure 8:
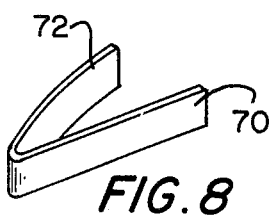
FIG. 8 is a perspective view of still another spring member embodiment.

The spring member shown im FIG. 8 is also a U-shaped spring with the base 70 having the same width as the other side 72. This U-shaped spring member may be inserted into the slot 26 of the crossbar shown in FIG. 2 by inserting the base 70 into groove 26; however, the curved portion of the spring will extend past the end of the bar 20.

Figure 9:
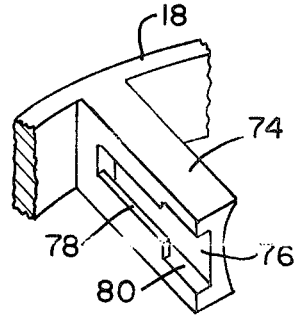
FIG. 9 is a fragmentary perspective view illustrating a crossbar having a different groove and slit structure from that shown in FIG. 2.

The spring member of FIG. 8 is preferably used with a cage having crossbars constructed as shown in FIG. 9. The crossbars 74 extending from rim 18 have a longitudinal groove 76 and a slit 78 extending circumferentially from groove 76. The slit 78 is enlarged to the same size as groove 76 adjacent the free end of crossbar 74 as indicated by number 80. The U-shaped spring of FIG. 8 will not extend beyond the open end of crossbar 74 when inserted into the groove of the crossbar.

I claim:

1. A cage assembly for an overrunning clutch comprising: a cage including at least one side rim and a plurality of circumferentially spaced crossbars extending from the side rim, said rim and crossbars defining circumferentially spaced roller receiving pockets, each crossbar having a longitudinal groove and a longitudinal slit extending circumferentially from the groove; and a roller biasing spring member having its base in the groove and another portion extending through the slit into the adjacent pocket.

2. A cage assembly in accordance with claim 1 wherein the spring member base is a flat plate and the other portion is a pair of flat springs.

3. A cage assembly in accordance with claim 1 wherein the spring member comprises a U-shaped spring having one side of the U in the groove with the other side of the U extending through the slit.

4. A cage in accordance with claim 1 wherein the spring member base is a flat plate and the other portion is a single flat spring.

5. A cage assembly for an overrunning clutch comprising: a cage including at least one side rim and a plurality of circumferentially spaced crossbars extending from the side rim, said rim and crossbars defining circumferentially spaced roller receiving pockets, each crossbar having a longitudinal groove and a longitudinal slit extending circumferentially from the groove, the slit being enlarged to the same size as the groove adjacent one end of the crossbar; and a U-shaped roller biasing spring member having one side in the groove and the other side extending into the adjacent pocket.

* * * * *